US012147192B2

(12) United States Patent
Kishida et al.

(10) Patent No.: US 12,147,192 B2
(45) Date of Patent: Nov. 19, 2024

(54) CARRIER FOR DEVELOPING ELECTROSTATIC LATENT IMAGE, TWO-COMPONENT DEVELOPER, IMAGE FORMING APPARATUS, PROCESS CARTRIDGE, AND IMAGE FORMING METHOD

(71) Applicants: Hiroyuki Kishida, Shizuoka (JP); Kousuke Suzuki, Shizuoka (JP); Tohru Suganuma, Shizuoka (JP); Minoru Masuda, Shizuoka (JP); Masashi Nagayama, Shizuoka (JP); Kento Takeuchi, Shizuoka (JP); Kaede Masuko, Shizuoka (JP)

(72) Inventors: Hiroyuki Kishida, Shizuoka (JP); Kousuke Suzuki, Shizuoka (JP); Tohru Suganuma, Shizuoka (JP); Minoru Masuda, Shizuoka (JP); Masashi Nagayama, Shizuoka (JP); Kento Takeuchi, Shizuoka (JP); Kaede Masuko, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 501 days.

(21) Appl. No.: 17/649,802

(22) Filed: Feb. 3, 2022

(65) Prior Publication Data

US 2022/0291603 A1 Sep. 15, 2022

(30) Foreign Application Priority Data

Mar. 5, 2021 (JP) ................................ 2021-035521

(51) Int. Cl.
*G03G 9/113* (2006.01)
*G03G 15/08* (2006.01)

(52) U.S. Cl.
CPC ......... *G03G 9/1139* (2013.01); *G03G 9/1131* (2013.01); *G03G 15/0865* (2013.01)

(58) Field of Classification Search
CPC ............... G03G 9/1139; G03G 9/1131; G03G 15/0865; G03G 9/1075
See application file for complete search history.

(56) References Cited

U.S. PATENT DOCUMENTS

2014/0248557 A1 9/2014 Yaguchi et al.
2015/0153665 A1 6/2015 Kishida et al.
(Continued)

FOREIGN PATENT DOCUMENTS

JP 2007-058124 3/2007
JP 2009-103787 5/2009
(Continued)

*Primary Examiner* — Stewart A Fraser
(74) *Attorney, Agent, or Firm* — Grüneberg and Myers PLLC.

(57) ABSTRACT

A carrier for developing an electrostatic latent image is provided. The carrier comprises a core particle having an internal void ratio of from 0.0% to 2.0% and a coating layer coating the core particle. The coating layer contains flat chargeable particles satisfying Formula 1 blow:

$$1.0 \leq R1/R2 \leq 3.0 \quad \text{Formula 1}$$

where R1 [nm] and R2 [nm] represent a major axis and a thickness, respectively, of each of the flat chargeable particles. The carrier has an apparent density of from 2.0 to 2.5 g/$cm^3$.

9 Claims, 3 Drawing Sheets

(56) References Cited

U.S. PATENT DOCUMENTS

| | | | | |
|---|---|---|---|---|
| 2020/0103778 | A1* | 4/2020 | Takabayashi | ........ G03G 9/1139 |
| 2020/0166867 | A1 | 5/2020 | Nagayama et al. | |
| 2020/0183297 | A1 | 6/2020 | Murata et al. | |
| 2020/0319571 | A1 | 10/2020 | Takeuchi et al. | |
| 2022/0283523 | A1* | 9/2022 | Nagayama | ............... G03G 9/10 |

FOREIGN PATENT DOCUMENTS

| | | |
|---|---|---|
| JP | 2014-029464 | 2/2014 |
| JP | 2014-170131 | 9/2014 |
| JP | 2017-215433 | 12/2017 |
| JP | 2020-118899 | 8/2020 |

* cited by examiner

CARRIER FOR DEVELOPING ELECTROSTATIC LATENT IMAGE, TWO-COMPONENT DEVELOPER, IMAGE FORMING APPARATUS, PROCESS CARTRIDGE, AND IMAGE FORMING METHOD

CROSS-REFERENCE TO RELATED APPLICATIONS

This patent application is based on and claims priority pursuant to 35 U.S.C. § 119(a) to Japanese Patent Application No. 2021-035521, filed on Mar. 5, 2021, in the Japan Patent Office, the entire disclosure of which is hereby incorporated by reference herein.

BACKGROUND

Technical Field

The present disclosure relates to a carrier for developing an electrostatic latent image, a two-component developer, an image forming apparatus, a process cartridge, and an image forming method.

Description of the Related Art

In recent years, electrophotographic image forming methods have been demanded to provide high image quality comparable to that of printing, and various improvements and developments have been made to meet the demand. In particular, to reliably provide high image quality over an extended period of time, improvements have been made in toner, carrier, and developing devices.

SUMMARY

Embodiments of the present invention provide a carrier for developing an electrostatic latent image. The carrier comprises a core particle having an internal void ratio of from 0.0% to 2.0% and a coating layer coating the core particle. The coating layer contains flat chargeable particles satisfying Formula 1 blow:

$1.0 \leq R1/R2 \leq 3.0$ Formula 1 where R1 [nm] and R2 [nm] represent a major axis and a thickness, respectively, of each of the flat chargeable particles. The carrier has an apparent density of from 2.0 to 2.5 g/cm$^3$.

Embodiments of the present invention provide a two-component developer comprising the above carrier and a toner.

Embodiments of the present invention provide an image forming apparatus. The image forming apparatus includes: an electrostatic latent image bearer; a charger to charge the electrostatic latent image bearer; an irradiator to form an electrostatic latent image on the electrostatic latent image bearer; a developing device containing the above two-component developer and configured to develop the electrostatic latent image into a toner image with the two-component developer; a transfer device configured to transfer the toner image from the electrostatic latent image bearer onto a recording medium; and a fixing device configured to fix the transferred toner image on the recording medium.

Embodiments of the present invention provide a process cartridge. The process cartridge includes: an electrostatic latent image bearer; a charger to charge the electrostatic latent image bearer; a developing device containing the above two-component developer and configured to develop an electrostatic latent image on the electrostatic latent image bearer into a toner image with the two-component developer; and a cleaner to clean the electrostatic latent image bearer.

Embodiments of the present invention provide an image forming method. The image forming method includes: forming an electrostatic latent image on an electrostatic latent image bearer; developing the electrostatic latent image into a toner image with the above two-component developer; transferring the toner image from the electrostatic latent image bearer onto a recording medium; and fixing the transferred toner image on the recording medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
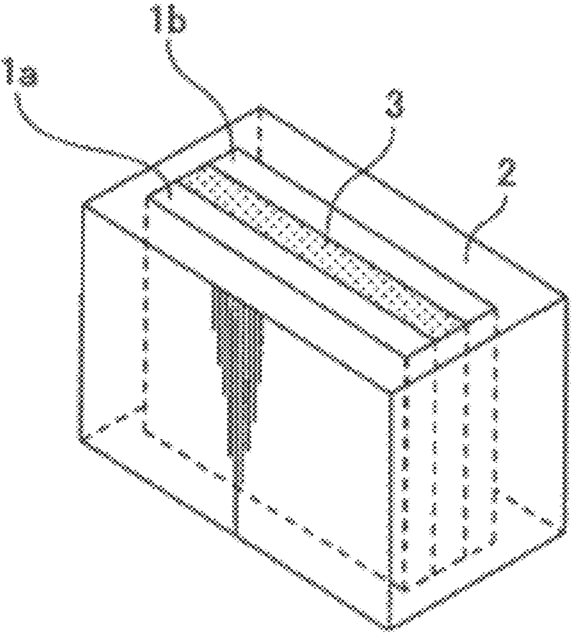
FIG. 1 is a diagram illustrating a cell used to measure the volume resistivity of a carrier.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a,” “an,” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a carrier for developing an electrostatic latent image is provided that is capable of maintaining charge stability, resistance stability, and high image quality over an extended period of time.

Embodiments of the present invention are described in detail below.

A carrier for developing an electrostatic latent image according to an embodiment of the present invention comprises a core particle and a coating layer coating the core particle. The coating layer contains flat chargeable particles. The carrier has an apparent density of from 2.0 to 2.5 g/cm$^3$. The core particle has an internal void ratio of from 0.0% to 2.0%. The flat chargeable particles satisfy Formula 1 blow, where R1 [nm] and R2 [nm] represent a major axis and a thickness, respectively, of each of the flat chargeable particles.

$$1.0 \leq R1/R2 \leq 3.0 \quad \text{Formula 1}$$

As a result of intensive studies, the inventors of the present invention have found that the charge stability and resistance stability can be maintained for an extended period of time when the apparent density of the carrier, the internal void ratio of the core particle, and the flat shape of the chargeable particles are suitably adjusted. A reason for this is considered to be that a specific flat shape of the chargeable particles, which affect chargeability, prevents the chargeable particles from separating from the coating layer over time and the chargeability and resistance are maintained over an extended period of time. Such an effect is remarkable when the surface roughness Rz (to be described in detail later) of the core particle is 2.0 μm or more and less than 3.0 μm. In this case, the chargeable particles present in the vicinity of projected portions of the core particle in the coating layer cover the projected portions, whereby the chargeable particles are more prevented from separating from the coating layer over time to maintain the chargeability and resistance over an extended period of time.

Furthermore, it has been unexpectedly found that the use of the carrier according to an embodiment of the present invention prevents a phenomenon called "ghost image" in which a difference in print density generates in an image. Although a mechanism of this phenomenon has not been cleared yet, it is considered that, as the chargeable particles are prevented from separating from the coating layer of the carrier, contamination of the developing sleeve, which causes the ghost image, is also prevented.

Accordingly, the carrier of according to an embodiment of the present invention is capable of maintaining charge stability, resistance stability, and high image quality over an extended period of time.

Coating Layer

The coating layer contains flat chargeable particles, preferably contains a resin, and may further contain other components as necessary.

Resin

Examples of the resin include silicone resin, acrylic resin, and combinations thereof. Preferred examples thereof include silicone resin and combinations of silicone resin and acrylic resin. Acrylic resins have high adhesiveness and low brittleness and thereby exhibit superior wear resistance. At the same time, acrylic resins have a high surface energy. Therefore, when used in combination with a toner which easily cause adhesion, the adhered toner components may be accumulated on the acrylic resin to cause a decrease of the amount of charge. This problem can be solved by using a silicone resin in combination with the acrylic resin. This is because silicone resins have a low surface energy and therefore the toner components are less likely to adhere thereto, which prevents accumulation of the adhered toner components that causes detachment of the coating layer. At the same time, silicone resins have low adhesiveness and high brittleness and thereby exhibit poor wear resistance. Thus, it is preferable that these two types or resins be used in a good balance to provide a coating layer having wear resistance to which toner is difficult to adhere. This is because silicone resins have a low surface energy and the toner components are less likely to adhere thereto, which prevents accumulation of the adhered toner components that causes detachment of the coating layer.

In the present disclosure, silicone resins refer to all known silicone resins. Examples thereof include, but are not limited to, straight silicone resins consisting of organosiloxane bonds, and modified silicone resins (e.g., alkyd-modified, polyester-modified, epoxy-modified, acrylic-modified, and urethane-modified silicone resins).

Commercially available products of the silicone resins can be used. Specific examples of commercially-available products of the straight silicone resins include, but are not limited to: KR271, KR255, and KR152 (products of Shin-Etsu Chemical Co., Ltd.); and SR2400, SR2406, and SR2410 (products of Dow Corning Toray Silicone Co., Ltd.). Each of these silicone resins may be used alone or in combination with a cross-linking component and/or a charge amount controlling agent. Specific examples of commercially-available products of the modified silicone resins include, but are not limited to: KR206 (alkyd-modified), KR5208 (acrylic-modified), ES1001N (epoxy-modified), and KR305 (urethane-modified) (products of Shin-Etsu Chemical Co., Ltd.); and SR2115 (epoxy-modified) and SR2110 (alkyd-modified) (products of Dow Corning Toray Silicone Co., Ltd.).

In the present disclosure, acrylic resins refer to all known resins containing an acrylic component and are not particularly limited. Each of these acrylic resins may be used alone or in combination with at least one cross-linking component. Specific examples of the cross-linking component include, but are not limited to, amino resins and acidic catalysts. Specific examples of the amino resins include, but are not limited to, guanamine resins and melamine resins. The acidic catalysts here refer to all materials having a catalytic action. Specific examples thereof include, but are not limited to, those having a reactive group of a completely alkylated type, a methylol group type, an imino group type, or a methylol/imino group type.

More preferably, the coating layer contains a cross-linked product of an acrylic resin and an amino resin.

In this case, the coating layers are prevented from fusing with each other while maintaining the proper elasticity.

Examples of the amino resin include, but are not limited to, melamine resins and benzoguanamine resins, which can improve charge giving ability of the resulting carrier. To more suitably control charge giving ability of the resulting carrier, a melamine resin and/or a benzoguanamine resin may be used in combination with another amino resin.

Preferred examples of the acrylic resin that is cross-linkable with the amino resin include those having a hydroxyl group and/or a carboxyl group. Those having a hydroxy group are more preferred. In this case, adhesiveness to the core particle and chargeable particles is more improved, and dispersion stability of the chargeable particles is also improved. In this case, preferably, the acrylic resin has a hydroxyl value of 10 mgKOH/g or more, and more preferably 20 mgKOH/g or more.

The resin may be an acrylic copolymer composed of monomer components A, B, and C as below. Such an acrylic copolymer makes the coating layer extremely tough, hard to be scraped, and highly durable. Even when the coating layer is made thin, the core particle is hardly exposed.

General Formula (1)

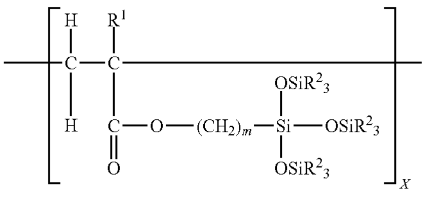

Unit A (Derived from Monomer Component A)

General Formula (2)

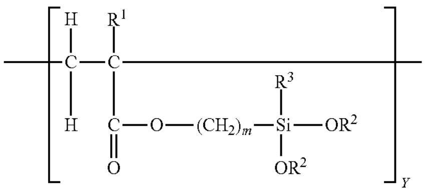

Unit B (Derived from Monomer Component B)

General Formula (3)

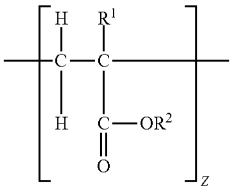

Unit C (derived from Monomer Component C)

In the general formulae (1) to (3). $R^1$, m, $R^2$, $R^3$, X, Y, and Z are as follows.

$R^1$ represents a hydrogen atom or methyl group. m represents an integer of from 1 to 8. Accordingly, $(CH_2)_m$ represents an alkylene group having 1 to 8 carbon atoms, such as methylene group, ethylene group, propylene group, and butylene group.

$R^2$ represents an alkyl group having 1 to 4 carbon atoms, such as methyl group, ethyl group, propyl group, isopropyl group, and butyl group.

$R^3$ represents an alkyl group having 1 to 8 carbon atoms, such as methyl group, ethyl group, propyl group, isopropyl group, and butyl group, or an alkoxy group having 1 to 4 carbon atoms, such as methoxy group, ethoxy group, propoxy group, and butoxy group.

It is preferable that X account for 10% to 40% by mol, Y account for 10% to 40% by mol, Z account for 30% to 80% by mol, and Y and Z in total account for more than 60% by mol and less than 90% by mol (i.e., 60% by mol<Y+Z<90% by mol).

The component A represented by the general formula (1) has a side chain containing tris(trimethylsiloxy)silane, i.e., an atomic group in which a large number of methyl groups are present. As the proportion of the component A to the entire resin increases, the surface energy decreases, and adhesion of resin components and wax components of toner decreases. When the proportion of the component A is 10% by mol or more, an effect of preventing a rapid increase in adhesion of toner components can be sufficiently exerted. When the proportion of the component A is 40% by mol or less, the proportions of the components B and C are not so low, and undesirable phenomena, such as poor progress in cross-linking, deterioration of toughness, low adhesion between the core particle and the coating layer, and poor durability of the coating layer of the carrier, can be prevented.

$R^2$ represents an alkyl group having 1 to 4 carbon atoms. Examples of the component A include tris(trialkylsiloxy) silane compounds represented by the following formula.

In the following formulae, Me represents methyl group, Et represents ethyl group, and Pr represents propyl group.

$CH_2{=}CMe\text{-}COO{-}C_3H_6{-}Si(OSiMe_3)_3$ $CH_2{=}CH{-}COO{-}C_3H{-}Si(OSiMe_3)_3$ $CH_2{=}CMe\text{-}COO{-}C_4H_8{-}Si(OSiMe_3)_3$ $CH_2{=}CMe\text{-}COO{-}C_3H_6{-}Si(OSiEt_3)_3$ $CH_2{=}CH{-}COO{-}C_3H_6{-}Si(OSiEt_3)_3$ $CH_2{=}CMe\text{-}COO{-}C_4H_8{-}Si(OSiEt_3)_3$ $CH_2{=}CMe\text{-}COO{-}C_3H_6{-}Si(OSiPr_3)_3$ $CH_2{=}CH{-}COO{-}C_3H_6{-}Si(OSiPr)_3$ $CH_2{=}CMe\text{-}COO{-}C_4H_8{-}Si(OSiPr_3)_3$ The component B represented by the general formula (2) is a radical-polymerizable difunctional (when $R^3$ is an alkyl group) or trifunctional (when $R^3$ is an alkoxy group) silane compound. When the component B accounts for 10% by mol or more, sufficient toughness can be achieved. When the proportion of the component B is 40% by mol or less, an undesirable phenomenon in which the coating layer becomes hard and brittle and easily scraped can be prevented. In addition, deterioration of environmental characteristics can be prevented. This is because, when a large number of hydrolyzed cross-linking components remain as silanol groups, environmental characteristics (e.g., humidity dependence) may deteriorate.

Specific examples of the component B include, but are not limited to, 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, 3-methacryloxypropylmethyldiethoxysilane, 3-methacryloxypropyltri(isopropoxy)silane, and 3-acryloxypropyltri (isopropoxy)silane. Each of these can be used alone or in combination with others.

The component C represented by the general formula (3) imparts flexibility to the coating layer and improves adhesion between the core particle and the coating layer. When the component C accounts for 30% by mol or more, sufficient adhesion can be achieved. When the component C accounts for 80% by mol or less, the proportion of any of the component A or the component B does not become 10% by mol or less, and the coating layer can achieve water repellency, hardness, and flexibility (i.e., film abrasion resistance) at the same time.

Preferred examples of acrylic compounds (monomers) as the component C include, but are not limited to, acrylates and methacrylates. Specific examples thereof include, but are not limited to, methyl methacrylate, methyl acrylate, ethyl methacrylate, ethyl acrylate, butyl methacrylate, butyl acrylate, 2-(dimethylamino)ethyl methacrylate, 2-(dimethylamino)ethyl acrylate, 3-(dimethylamino)propyl methacrylate, and 3-(dimethylamino)propyl acrylate. Each of these can be used alone or in combination with others. Among these, alkyl methacrylates are preferred, and methyl methacrylate is more preferred.

In a preferred embodiment, the monomer components A, B, and C are subjected to radical copolymerization to obtain an acrylic copolymer, the acrylic copolymer is hydrolyzed to generate silanol groups, and the silanol groups are condensed using a catalyst, thus obtaining a cross-linked product. The cross-linked product is made to coat the core particle and subjected to a heat treatment to form a coating layer. Examples of the catalyst used in the condensation polymerization include, but are not limited to, titanium-based catalysts, tin-based catalysts, zirconium-based catalysts, and aluminum-based catalysts.

Among these, titanium-based catalysts are preferred. Among titanium-based catalysts, titanium diisopropoxybis (ethylacetoacetate) is particularly preferred. The reason for this is considered that this catalyst effectively accelerates condensation of silanol groups and is less likely to be deactivated.

Chargeable Particles

In the present disclosure, chargeable particles having a flat shape ("flat chargeable particles") are used.

To maintain the charging function over an extended period of time, the chargeable particles should not be separated from the coating layer of the carrier even when the carrier receives a stress inside a developing device. Therefore, the flat chargeable particles satisfy preferably Formula 1 below, more preferably Formula 10 below, where R1 [nm] and R2 [nm] represent a major axis and a thickness, respectively, of each of the flat chargeable particles.

$$1.0 \leq R1/R2 \leq 3.0 \quad \text{Formula 1}$$

$$1.2 \leq R1/R2 \leq 2.0 \quad \text{Formula 10}$$

When the ratio R1/R2 is within the specified range, the chargeable particles have an appropriately elongated particle shape and are less likely to be separated from the coating layer even when receiving a stress in the coating layer overtime. When the ratio R1/R2 is less than 1.0, the chargeable particles are more likely to be separated from the coating layer with time due to their shapes. When the ratio R1/R2 is larger than 3.0, peripheral portions of the chargeable particles protrude from the coating layer to form protruded portions, and the protruded portions collide with each other with time to cause scraping of the coating layer.

Figure 3A:
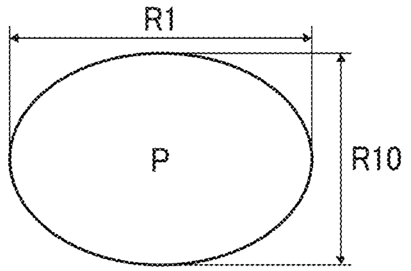
FIGS. 3A and 3B are diagrams for explaining the shape of a flat chargeable particle according to an embodiment of the present invention.
Figure 3B:

FIGS. 3A and 3B are diagrams for explaining the shape of the flat chargeable particle in the present disclosure. FIG. 3A is a plan view of a chargeable particle P, and FIG. 3B is a side view of the chargeable particle P. The flat chargeable particle P of the present disclosure has a major axis R1 and a minor axis R10 in the plan view (FIG. 3A), and has a thickness R2 that is shorter than both of the major axis R1 and the minor axis R10 in the side view (FIG. 3B). The major axis R1 refers to the longest radius of the largest projected area of the chargeable particle P. The thickness R2 refers to the longest length of a line segment perpendicular to the largest projected area and drawn from the major axis R1.

R1 and R2 of the flat chargeable particles are measured by the methods described in Examples later.

Preferably, the chargeable particles are large to some extent to impart a charging function to the carrier. Specifically, the major axis R1 is preferably from 300 to 600 nm. More preferably, the major axis R1 is from 400 to 500 nm. When R1 is 300 nm or more, a sufficient chargeability can be exhibited. When R1 is 600 nm or less, the chargeable particles can be further prevented from being separated from the coating layer.

The number of parts of the chargeable particles contained in the coating layer is preferably from 10 to 25 parts by mass, more preferably from 15 to 20 parts by mass, with respect to 100 parts by mass of the resin contained in the coating layer. When the number of parts is 10 parts by mass or more, the chargeability and the strength of the coating layer are further improved. When the number of parts is 25 parts by mass or less, the chargeable particles are appropriately exposed at the surface of the carrier, and the external additive of the toner is less likely to be spent thereon, resulting in good charge maintainability.

Specific examples of the chargeable particles include, but are not limited to, titanium oxide, tin oxide, zinc oxide, alumina, barium sulfate, magnesium oxide, magnesium hydroxide, and hydrotalcite. Each of these can be used alone or in combination with others Among these, barium sulfate is preferred for maintaining chargeability for an extended period of time.

As the chargeable particles, commercially available products can be used. For example, a barium sulfate BF-10 available from Sakai Chemical Industry Co., Ltd. can be used.

Conductive Particles

For the purpose of adjusting the resistance of the carrier, conductive particles can be used. Preferred examples of the conductive particles include inorganic pigments coated with a conductive material, for their durability. Examples of the conductive material include, but are not limited to, indium-doped tin oxide, tungsten-doped tin oxide, phosphorus-doped tin oxide, niobium, tantalum, antimony, and fluorine-doped products. In view of productivity, safety, cost, and the like, tungsten-doped tin and tungsten-doped tin are preferred.

Examples of the inorganic pigment serving as the base particle of the conductive particle include, but are not limited to, titanium dioxide, aluminum oxide, silicon dioxide, zinc oxide, barium sulfate, zirconium oxide, alkali metal titanate, and muscovite, all of which are commercially available. Taking titanium dioxide as an example, there is no limitation on the size of the particles, and particles having any shape (e.g., spherical, needle-like) and any crystal form (e.g., anatase type, rutile type, amorphous type) can be used.

The conductive particles preferably have a secondary particle diameter of from 0.20 to 0.80 μm, more preferably from 0.30 to 0.60 μm. The secondary particle diameter of the conductive particles can be measured using a dynamic light scattering particle size distribution measuring apparatus.

The number of parts of the conductive particles contained in the coating layer is preferably from 10 to 25 parts by mass, more preferably from 15 to 20 parts by mass, with respect to 100 parts by mass of the resin contained in the coating layer. When the number of parts is 10 parts by mass or more, an effect of reducing the resistance of the carrier is sufficiently exhibited. When the number of parts is 25 parts by mass or less, the conductive particles are prevented from being exposed at the surface of the carrier, and the external additive of the toner is less likely to be spent thereon, resulting in good resistance maintainability.

The conductive particles can be produced by various methods, for example, by uniformly depositing a tin salt hydrate layer containing a hydrate of a phosphorus or tungsten salt on the surfaces of inorganic pigment particles, and firing the resulted coating layer. Uniform deposition of a tin salt hydrate layer containing a hydrate of a phosphorus or tungsten salt on the surfaces of inorganic pigment particles can be achieved by, for example, simultaneously dropping, into an aqueous solution in which inorganic pigment particles are dispersed, an acidic aqueous solution dissolving a phosphorus salt (e.g., phosphorus pentoxide, $POCl_3$) or tungsten salt (e.g., tungsten chloride, tungsten oxychloride, sodium tungstate, tungstic acid) and a tin salt (e.g., a tin salt such as tin chloride, tin sulfate, and tin nitrate, a stannate such as sodium stannate and potassium stannate, or an organotin compound such as tin alkoxide) and a pH adjuster (e.g., an aqueous solution of a base) for precipitating and depositing the dropped phosphorus or tungsten and tin on the surface of the pigment particles in the form of a hydrate. This procedure prevents dissolution or surface deterioration of the inorganic pigment particles by an acid or an alkali. In this procedure, the doping ratio of phosphorus or tungsten to the surface of the inorganic pigment particles can be adjusted by adjusting the dropping amount of phosphorus or tungsten and the dropping amount of the tin chloride solution. (It is preferred to note that the isoelectric point of the tin hydrate, i.e., tin hydroxide or stannic acid, and that of the phosphorus or tungsten component are not necessarily the same, nor are there any differences in their solubility at a particular pH.) For the purpose of mitigating the aggression to the inorganic pigment particles during the dropping operation and the violent hydration reaction of phosphorus or tungsten and tin to homogenize the coating layer, a water-soluble organic solvent such as methanol or methyl ethyl ketone can be mixed therein. The resulted hydrate is preferably fired at 300° C. to 850° C. in a non-oxidizing atmosphere, which results in a powder having a very low volume resistivity compared to that obtained by a heat treatment in air.

The conductive particles may be subjected to a surface treatment. The surface treatment fixes the conductive layer as the upper layer to the surfaces of the particles uniformly and firmly to sufficiently exhibit a resistance adjusting effect. Amino-based silane coupling agents, methacryloxy-based silane coupling agents, vinyl-based silane coupling agents, and mercapto-based silane coupling agents can be used.

Other Components

The other components are not particularly limited and can be suitably selected to suit to a particular application. Examples thereof include, but are not limited to, a silane coupling agent.

Silane Coupling Agent

The silane coupling agent is not particularly limited and can be suitably selected to suit to a particular application. Specific examples thereof include, but are not limited to, methyltrimethoxysilane, methyltriethoxysilane, vinyltriacetoxysilane, γ-chloropropyltrimethoxysilane, hexamethyldisilazane, γ-anilinopropyltrimethoxysilane, vinyltrimethoxysilane, octadecyldimethyl[3-(trimethoxysilyl)propyl] ammonium chloride, γ-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and methacrloxyethyldimethyl(3-trimethoxysilylpropyl)ammonium chloride. Each of these can be used alone or in combination with others.

Commercially-available products can be used as the silane coupling agent. Specific examples of commercially-available products include, but are not limited to, AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (products of Toray Silicone Co., Ltd.).

The proportion of the silane coupling agent with respect to 100 parts by mass of the resin contained in the coating layer is preferably from 0.1% to 10% by mass. When the proportion of the silane coupling agent is less than 0.1% by mass, adhesion strength between the core particle/conductive particle and the silicone resin may be reduced to cause detachment of the coating layer during a long-term use. When the proportion exceeds 10% by mass, toner filming may occur in a long-term use.

Core Particle

The core particle is not particularly limited as long as it is a magnetic material. Specific examples thereof include, but are not limited to: ferromagnetic metals such as iron and cobalt; iron oxides such as magnetite, hematite, and ferrite; various alloys and compounds; and resin particles in which these magnetic materials are dispersed. Among these materials, Mn ferrite, Mn—Mg ferrite, and Mn—Mg—Sr ferrite are preferred because they are environmentally-friendly.

The core particle has a specific internal void ratio. Preferably, the core particle also has a specific surface roughness Rz. The internal void ratio represents, in a cross section of the core particle, the ratio of the sum of the areas of internal voids to the total area of the core particle. The smaller the ratio, the smaller the number of internal voids and the denser the core particle. Such a dense core particle can be increased in magnetization, which is desirable for preventing carrier deposition. Preferably, the internal void ratio is from 0.0% to 2.0%. When the internal void ratio exceeds 2.0%, the number of internal voids is large and the magnetization of the core particle thereby decreases, more causing carrier deposition. The internal void ratio can be calculated, for example, by analysis of a cross-sectional image of the core particle obtained with a scanning electron microscope (SEM).

The surface roughness Rz refers to the maximum height roughness, which is obtained by extracting a part of a roughness profile for a sampling length in the direction of the average line of the roughness profile, measuring the distance between the peak line and the valley line in the direction of longitudinal magnification of the roughness profile in the extracted part, and expressing this value in micrometers (i.e., μm). When the value of Rz is large, the degree of unevenness of the surface becomes remarkable, and the packing property of the core particles is affected. Rz is preferably 2.0 μm or more and less than 3.0 μm, and more preferably 2.3 μm or more and 2.7 μm or less. When Rz of the core particle is adjusted as above, the core particle can be maintained in a properly packed state even after being formed into a carrier, improving image quality. When Rz is 2.0 μm or more, the smoothness and packing property of the surface of the core particle become appropriate, the apparent density is reduced when the core particle is formed into a carrier, and low quality image (such as ghost image) can be prevented. When Rz is less than 3.0 μm, the degree of unevenness of the surface of the core particle becomes appropriate, protruded portions of the core particle can be favorably covered with a resin layer at the time of forming a carrier, and solid carrier deposition can be prevented. Rz can be calculated from surface observation data obtained with a confocal microscope.

Method for Manufacturing Carrier

The carrier may be manufactured by, for example, dissolving the resin, etc., in a solvent to prepare a coating liquid and uniformly coating the surface of the core particle with the coating liquid by a known coating method, followed by drying and baking. Examples of the coating method include, but are not limited to, dipping, spraying, and brush coating.

The solvent is not particularly limited and can be suitably selected to suit to a particular application. Specific examples thereof include, but are not limited to, toluene, xylene, methyl ethyl ketone, methyl isobutyl ketone, cellosolve, and butyl acetate.

The baking method is not particularly limited and can be suitably selected to suit to a particular application. Specific examples thereof include, but are not limited to, external heating methods and internal heating methods.

The baking instrument is not particularly limited and can be suitably selected to suit to a particular application. Specific examples thereof include, but are not limited to, stationary electric furnaces, fluxional electric furnaces, rotary electric furnaces, burner furnaces, and instruments equipped with microwave.

The average thickness of the coating layer is preferably from 0.50 to 1.10 μm, and more preferably from 0.60 to 1.00 μm. When the average thickness is 0.50 μm or more, the coating layer is prevented from being scraped upon collision of the carriers over time. When the average thickness is 1.10 μm or less, the external additive of the toner is prevented from transferring onto the surface of the carrier over time, and the charging ability of the carrier is maintained. The average thickness of the coating layer can be calculated, for example, by measuring a cross-sectional image with a scanning electron microscope (SEM).

In the coating layer of the present embodiment, the chargeable particles tend to be arranged in a horizontal direction with respect to the plane of the core particle. It is considered that such a configuration advantageously acts on effects of the present invention.

Properties of Carrier

The carrier of the present embodiment has an apparent density of preferably from 2.0 to 2.5 $g/cm^3$, and more preferably from 2.1 to 2.4 $g/cm^3$. The apparent density affects the degree of spent of the carrier caused by the external additive of the toner during friction between the carrier and the toner in a developing device. When the apparent density is less than 2.0 $g/cm^3$, the carrier tends to scatter because the carrier is light. When the apparent density is greater than 2.5 $g/cm^3$, spent of the carrier caused by the external additive progresses, and the charging ability of the carrier cannot be maintained for an extended period of time. The apparent density of the carrier can be measured, for example, by the method described in Japanese Industrial Standards (JIS) Z 2504.

The carrier of the present embodiment preferably has a volume resistivity of from 10 to 14 Log Ω·cm. When the volume resistivity is 10 Log Ω·cm or more, the occurrence of carrier deposition is prevented in non-image portions. When the volume resistivity is 14 Log Ω·cm or less, the edge effect becomes an acceptable level.

The volume resistivity of the carrier can be measured using a cell illustrated in FIG. 1. Specifically, the cell comprises a fluororesin container 2 in which electrodes 1*a* and 1*b* each having a surface area of 2.5 cm×4 cm are accommodated with a distance of 0.2 cm therebetween. The cell is filled with a carrier 3 and thereafter subjected to tapping 10 times under the condition that the falling height is 1 cm and the tapping speed is 30 times per minute. Next, a direct-current voltage of 1,000 V is applied to between the electrodes 1*a* and 1*b*, and 30 seconds later, a resistance value r [Ω] is measured using a HIGH RESISTANCE METER 4329A (product of Yokogawa-Hewlett-Packard, Ltd.). The volume resistivity [Ω·cm] is calculated from the following formula.

$$r\times(2.5\times4)/0.2$$

The volume resistivity [Log Ω·cm] of the carrier is the common logarithm value of the volume resistivity [Ω·cm] obtained by the above measurement procedure.

Two-Component Developer

A two-component developer according to an embodiment of the present invention contains the carrier according to an embodiment of the present invention and a toner.

In the two-component developer, the amount of the toner mixed with 100 parts by mass of the carrier is preferably from 2.0 to 12.0 parts by mass, more preferably from 2.5 to 10.0 parts by mass.

Toner

The toner contains a binder resin and a colorant. The toner may be a toner for either black-and-white printing or color printing. The toner may further contain a release agent to be used in oilless fixing systems in which the fixing roller is free of application of toner adherence preventing oil. Although such a toner is likely to cause filming, the carrier according to an embodiment of the present invention can prevent the occurrence of filming, and the developer according to an embodiment of the present invention can provide high-quality images for an extended period of time.

Color toners, particularly yellow toners, generally have a drawback that the color is contaminated with the coating layer which has been scraped off from the carrier. The developer according to an embodiment of the present invention can prevent such a contamination of the color.

The toner can be produced by known methods such as pulverization methods and polymerization methods. In a typical pulverization method, toner materials are melt-kneaded, the melt-kneaded product is cooled and pulverized into particles, and the particles are classified by size, thus preparing mother particles. To more improve transferability and durability, an external additive is added to the mother particles, thus obtaining a toner.

A kneader for kneading the toner materials is not particularly limited and can be suitably selected to suit to a particular application. Specific examples thereof include, but are not limited to, a batch-type double roll mill; BANBURY MIXER; double-axis continuous extruders such as TWIN SCREW EXTRUDER KTK (product of Kobe Steel, Ltd.), TWIN SCREW COMPOUNDER TEM (product of Toshiba Machine Co., Ltd.), MIRACLE K.C.K (product of Asada Iron Works Co., Ltd.), TWIN SCREW EXTRUDER PCM (product of Ikegai Corp), and KEX EXTRUDER (product of Kurimoto, Ltd.); and single-axis continuous extruders such as KOKNEADER (product of Buss Corporation).

The cooled melt-kneaded product may be coarsely pulverized by a HAMMER MILL or a ROTOPLEX and thereafter finely pulverized by a jet-type pulverizer or a mechanical pulverizer. Preferably, the pulverization is performed such that the resulting particles have a volume average particle diameter of from 3 to 15 μm.

When classifying the pulverized melt-kneaded product, a wind-power classifier may be used. Preferably, the classification is performed such that the resulting mother particles have a volume average particle diameter of from 5 to 20 μm.

The external additive is added to the mother particles by being stir-mixed therewith by a mixer, so that the external additive gets adhered to the surfaces of the mother particles while being pulverized.

Binder Resin

The binder resin is not particularly limited and can be suitably selected to suit to a particular application. Examples thereof include, but are not limited to: homopolymers of styrene or substituted products thereof, such as polystyrene, poly p-styrene, and polyvinyl toluene; styrene-based copolymers such as styrene-p-chlorostyrene copolymer, styrene-propylene copolymer, styrene-vinyltoluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-a-methyl chloromethacrylate copolymer, styrene-acrylonitrile copolymer, styrene-vinyl methyl ether copolymer, styrene-vinyl methyl ketone copolymer, styrene-butadiene copolymer, styrene-isoprene copolymer, and styrene-maleate copolymer; and polymethyl methacrylate, polybutyl methacrylate, polyvinyl chloride, polyvinyl acetate, polyethylene, polyester, polyurethane, epoxy resin, polyvinyl butyral, polyacrylic acid, rosin, modified rosin, terpene resin, phenol resin, aliphatic or aromatic hydrocarbon resin, and aromatic petroleum resin. Each of these can be used alone or in combination with others.

The binder resins for pressure fixing are not particularly limited and can be suitably selected to suit to a particular application. Specific examples thereof include, but are not limited to: polyolefins (e.g., low-molecular-weight polyethylene, low-molecular-weight polypropylene), olefin copolymers (e.g., ethylene-acrylic acid copolymer, ethylene-acrylate copolymer, styrene-methacrylic acid copolymer, ethylene-methacrylate copolymer, ethylene-vinyl chloride copolymer, ethylene-vinyl acetate copolymer, ionomer resin), epoxy resin, polyester resin, styrene-butadiene copolymer, polyvinyl pyrrolidone, methyl vinyl ether-maleic acid anhydride copolymer, maleic-acid-modified phenol resin, and phenol-modified terpene resin. Each of these can be used alone or in combination with others.

Colorant

Usable colorants (i.e., pigments and dyes) are not particularly limited and can be suitably selected to suit to a particular application. Specific examples thereof include, but are not limited to, yellow pigments such as Cadmium Yellow, Mineral Fast Yellow, Nickel Titanium Yellow, Naples Yellow, Naphthol Yellow S, Hansa Yellow G, Hansa Yellow 10G, Benzidine Yellow GR, Quinoline Yellow Lake, Permanent Yellow NCG, and Tartrazine Lake; orange pigments such as Molybdenum Orange. Permanent Orange GTR, Pyrazolone Orange, Vulcan Orange, Indanthrene Brilliant Orange RK, Benzidine Orange G, and Indanthrene Brilliant Orange GK; red pigments such as Red Iron Oxide, Cadmium Red, Permanent Red 4R, Lithol Red. Pyrazolone Red, Watching Red calcium salt, Lake Red D, Brilliant Carmine 6B, Eosin Lake, Rhodamine Lake B, Alizarin Lake, and Brilliant Carmine 3B; violet pigments such as Fast Violet B and Methyl Violet Lake; blue pigments such as Cobalt Blue, Alkali Blue, Victoria Blue lake, Phthalocyanine Blue. Metal-free Phthalocyanine Blue, partial chlorination product of Phthalocyanine Blue, Fast Sky Blue, and Indanthrene Blue BC; green pigments such as Chrome Green, chromium oxide, Pigment Green B, and Malachite Green Lake; and black pigments such as azine dyes (e.g., carbon black, oil furnace black, channel black, lamp black, acetylene black, aniline black), metal salt azo dyes, metal oxides, and combined metal oxides. Each of these can be used alone or in combination with others.

Release Agent

The release agent not particularly limited and can be suitably selected to suit to a particular application. Specific examples thereof include, but are not limited to, polyolefins (e.g., polyethylene, polypropylene), fatty acid metal salts, fatty acid esters, paraffin waxes, amide waxes, polyvalent alcohol waxes, silicone varnishes, carnauba waxes, and ester waxes. Each of these can be used alone or in combination with others.

Charge Controlling Agent

The toner may further contain a charge controlling agent. The charge controlling agent is not particularly limited and can be suitably selected to suit to a particular application. Specific examples thereof include, but are not limited to: nigrosine; azine dyes having an alkyl group having 2 to 16 carbon atoms; basic dyes such as C. I. Basic Yellow 2 (C. I. 41000), C. I. Basic Yellow 3, C. I. Basic Red 1 (C. I. 45160), C. I. Basic Red 9 (C. I. 42500), C. I. Basic Violet 1 (C. I. 42535), C. I. Basic Violet 3 (C. I. 42555), C. I. Basic Violet 10 (C. I. 45170), C. I. Basic Violet 14 (C. I. 42510), C. I. Basic Blue 1 (C. I. 42025), C. I. Basic Blue 3 (C. I. 51005), C. I. Basic Blue 5 (C. I. 42140), C. I. Basic Blue 7 (C. I. 42595), C. I. Basic Blue 9 (C. I. 52015), C. I. Basic Blue 24 (C. I. 52030), C. I. Basic Blue 25 (C. I. 52025), C. I. Basic Blue 26 (C. I. 44045), C. I. Basic Green 1 (C. I. 42040), and C. I. Basic Green 4 (C. I. 42000); lake pigments of these basic dyes; quaternary ammonium salts such as C. I. Solvent Black 8 (C. I. 26150), benzoylmethylhexadecylammonium chloride, and decyltrimethyl chloride; dialkyl (e.g., dibutyl, dioctyl) tin compounds; dialkyl tin borate compounds; guanidine derivatives; polyamine resins such as vinyl polymers having amino group and condensed polymers having amino group; metal complex salts of monoazo dyes; metal complexes of salicylic acid, dialkyl salicylic acid, naphthoic acid, and dicarboxylic acid with Zn, Al, Co, Cr, and Fe; sulfonated copper phthalocyanine pigments; organic boron salts; fluorine-containing quaternary ammonium salts; and calixarene compounds. Each of these can be used alone or in combination with others. For color toners other than black toner, metal salts of salicylic acid derivatives, which are white, are preferred.

External Additive

The external additive is not particularly limited and can be suitably selected to suit to a particular application. Specific examples thereof include, but are not limited to: inorganic particles such as silica, titanium oxide, alumina, strontium titanate, silicon carbide, silicon nitride, and boron nitride; and resin particles such as polymethyl methacrylate particles and polystyrene particles having an average particle diameter of from 0.05 to 1 μm, obtainable by soap-free emulsion polymerization. Each of these can be used alone or in combination with others. Among these, silica having a hydrophobized surface is preferred.

A combination of two or more types of silicas having different particle diameters is more preferred. Specifically, a combination of silicas respectively having secondary particle diameters of 100 nm or more and less than 100 nm is preferred. A silica having a large particle diameter of 100 nm or more acts as a spacer for mother toner particles and is able to separate the mother particles that have high adhesion from one another. A silica having a small particle diameter of less than 100 nm imparts fluidity to the resultant toner when externally added to the mother toner particles. Thus, the resultant toner particles have high fluidity and are present being separated from one another, which contributes to high image quality.

The secondary particle diameter can be measured using, for example, an instrument ZETASIZER Pro (product of Spectris Co., Ltd.).

The total number of parts of the large-particle-diameter silica and the small-particle-diameter silica is preferably from 1.5 to 5 parts by mass, more preferably from 2 to 3 parts by mass, with respect to 100 parts by mass of the mother toner. When the total number of parts is 1.5 parts by mass or more, the fluidity of the toner is high, and defective transfer of the toner can be prevented in the transfer process. When the total number of parts is 5 parts by mass or less, adhesion of the silica to an electrostatic latent image bearer is prevented, and generation of abnormal images is prevented.

The color of the toner is not particularly limited and can be suitably selected to suit to a particular application. The toner may be at least one of a black toner, a cyan toner, a magenta toner, and a yellow toner. Each of these toners can be obtained by selecting a suitable colorant. Preferably, the toner is a color toner.

Process Cartridge

A process cartridge according to an embodiment of the present invention includes: an electrostatic latent image bearer; a charger to charge the electrostatic latent image bearer; a developing device containing the two-component developer according to an embodiment of the present invention, and configured to develop an electrostatic latent image on the electrostatic latent image bearer into a toner image with the two-component developer; and a cleaner to clean the electrostatic latent image bearer. The process cartridge may further include other members as necessary.

The process cartridge is detachably mountable on various types of electrophotographic image forming apparatuses. Preferably, the process cartridge is detachably mounted on the image forming apparatus according to an embodiment of the present invention to be described later.

Image Forming Apparatus and Image Forming Method

An image forming apparatus according to an embodiment of the present invention includes: an electrostatic latent image bearer; a charger to charge the electrostatic latent image bearer; an irradiator to form an electrostatic latent image on the electrostatic latent image bearer; a developing device containing the two-component developer according to an embodiment of the present invention, and configured to develop the electrostatic latent image into a toner image with the two-component developer; a transfer device configured to transfer the toner image from the electrostatic latent image bearer onto a recording medium; and a fixing device configured to fix the transferred toner image on the recording medium. The image forming apparatus may further include other members as necessary.

An image forming method according to an embodiment of the present invention includes the processes of: forming an electrostatic latent image on an electrostatic latent image bearer; developing the electrostatic latent image into a toner image with the two-component developer according to an embodiment of the present invention; transferring the toner image from the electrostatic latent image bearer onto a recording medium, and fixing the transferred toner image on the recording medium. The image forming method may further include other processes as necessary.

Figure 5:
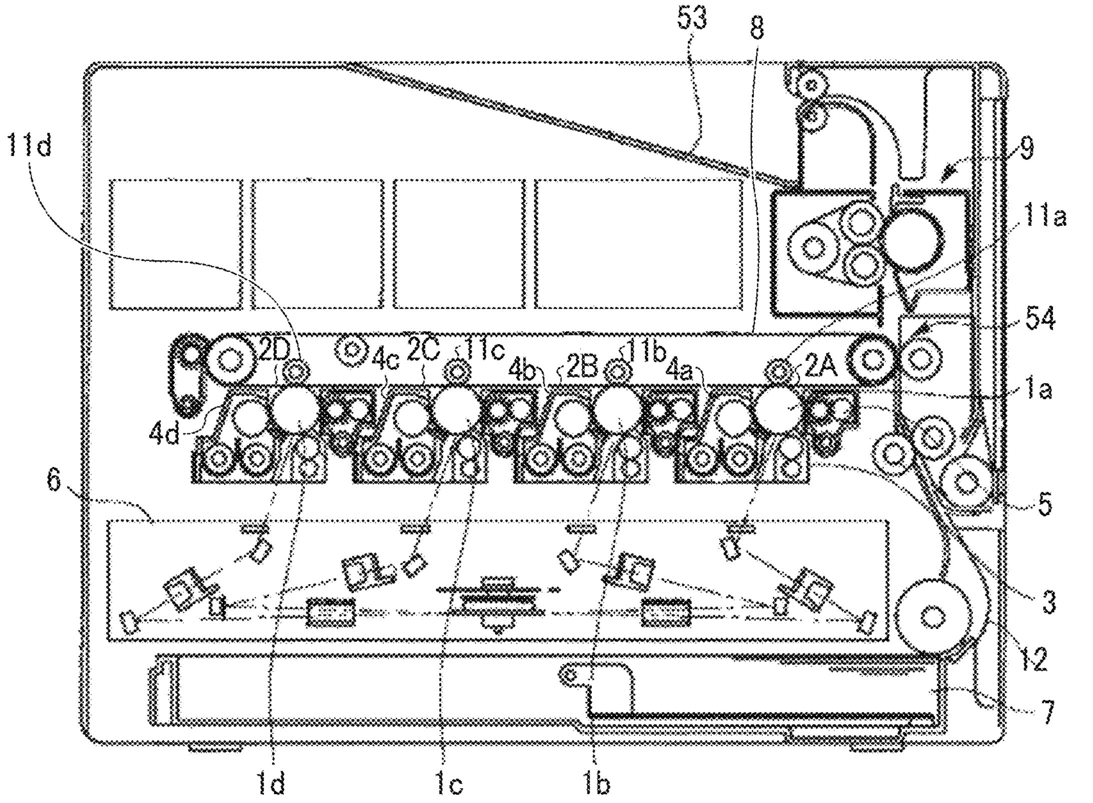
FIG. 5 is a schematic diagram illustrating an image forming apparatus according to an embodiment of the present invention.

FIG. 5 is a schematic diagram illustrating an image forming apparatus according to an embodiment of the present invention. This image forming apparatus includes electrostatic latent image bearers 1*a*, 1*b*, 1*c*, and 1*d*; chargers 3*a*, 3*b*, 3*c*, and 3*d* to charge the electrostatic latent image bearers 1*a*, 1*b*, 1*c*, and 1*d*; an irradiator 6 to form electrostatic latent images on the electrostatic latent image bearers 1*a*, 1*b*, 1*c*, and 1*d*; developing devices 4*a*, 4*b*, 4*c*, and 4*d* containing the two-component developers according to embodiments of the present invention, and configured to develop the electrostatic latent images into toner images with the two-component developers; an intermediate transferor 8, primary transfer devices 11*a*, 11*b*, 11*c*, and 11*d*, a secondary transfer device 54, all serving as transfer devices configured to transfer the toner images from the electrostatic latent image bearers 1*a*, 1*b*, 1*c*, and 1*d* onto a recording medium 12; and a fixing device 9 configured to fix the transferred toner images on the recording medium 12. The image forming apparatus further includes a cleaner 5, a sheet feeder 7, and an output tray 53. Reference numerals 200A, 200B, 200C, and 200D each denote process cartridges according to embodiments of the present invention.

Electrostatic Latent Image Bearer

The material, shape, structure, size, and the like of the electrostatic latent image bearer are not particularly limited and can be suitably selected to suit to a particular application.

The shape may be, for example, a drum shape.

The material may be, for example, inorganic photoconductors such as amorphous silicon and selenium, and organic photoconductors such as polysilane and phthalopolymethine. Among these materials, amorphous silicone is preferable for its long operating life.

An amorphous silicon photoconductor can be prepared by, for example, heating a substrate to 50° C. to 400° C. and forming a photoconductive layer comprising amorphous silicon on the substrate by a film formation process such as vacuum deposition, sputtering, ion plating, thermal CVD (Chemical Vapor Deposition), optical CVD, and plasma CVD. In particular, plasma CVD, which forms an amorphous silicon film on the substrate by decomposing a raw material gas by direct-current, high-frequency, or microwave glow discharge, is preferred.

Charger and Charging Process

The charging process can be conducted by, for example, applying a voltage to a surface of the electrostatic latent image bearer by the charger.

The charger is not particularly limited and can be suitably selected to suit to a particular application. Specific examples thereof include, but are not limited to, contact chargers equipped with a conductive or semiconductive roller, brush, film, or rubber blade and non-contact chargers employing corona discharge such as corotron and scorotron.

The shape of the charger is determined in accordance with the specification or configuration of the electrophotographic image forming apparatus, and may be in the form of a roller, a magnetic brush, or a fur brush. The magnetic brush may be composed of various ferrite particles (e.g., Zn—Cu ferrite) serving as the charger, a non-magnetic conductive sleeve for supporting the ferrite particles, and a magnet roll contained inside the conductive sleeve. The fur brush may be made of a fur having been subjected to a conductive treatment with carbon, copper sulfide, a metal, or a metal oxide. Such a fur is wound around or attached to a cored bar having been subjected to a conductive treatment with a metal or the like to be formed into the charger.

The charger is not limited to the contact charger. However, the contact charger is preferred because the amount of by-product ozone is small.

Irradiator and Irradiation Process

The irradiation process can be conducted by, for example, irradiating the surface of the electrostatic latent image bearer with light containing image information by the irradiator.

The irradiator is not particularly limited and can be suitably selected to suit to a particular application as long as it can irradiate the surface of the electrostatic latent image bearer charged by the charger with light containing information of an image to be formed. Specific examples thereof include, but are not limited to, various irradiators of radiation optical system type, rod lens array type, laser optical type, and liquid crystal shutter optical type.

The irradiation can also be conducted by irradiating the back surface of the electrostatic latent image bearer with light containing image information.

Developing Process and Developing Device

The developing device develops the electrostatic latent image with the toner or two-component developer to form a visible image.

The visible image can be formed, for example, by developing the electrostatic latent image with the toner or two-component developer of the present embodiment.

The developing device is not particularly limited and can be suitably selected to suit to a particular application as long as it is capable of developing the electrostatic latent image with the toner or two-component developer. Preferably, the developing device includes a developing unit storing the toner or two-component developer and is configured to apply the toner or two-component developer to the electrostatic latent image by contacting or without contacting the electrostatic latent image. More preferably, the developing unit is equipped with a container containing the toner.

The developing device may employ either a dry developing method or a wet developing method. The developing device may be either a monochrome developing device or a multicolor developing device. Preferably, the developing device includes a stirrer that triboelectrically charges the toner or two-component developer, and a rotatable magnet roller.

In the developing device, toner particles and carrier particles are mixed and stirred. The toner particles are charged by friction and retained on the surface of the rotating magnet roller, thus forming magnetic brush. The magnet roller is disposed proximity to the electrostatic latent image bearer (photoconductor), so that a part of the toner particles composing the magnetic brush formed on the surface of the magnet roller are moved to the surface of the electrostatic latent image bearer (photoconductor) by an electric attractive force. As a result, the electrostatic latent image is developed with the toner particles and a visible image is formed with the toner particles on the surface of the electrostatic latent image bearer (photoconductor).

The developer contained in the developing device is a developer containing the toner. The developer may be either a one-component developer or a two-component developer. The toner contained in the developer is the toner described above.

Transfer Process and Transfer Device

The transfer device is not particularly limited and can be suitably selected to suit to a particular application as long as it is capable of transferring the visible image onto a recording medium. Preferably, the transfer device includes an intermediate transferor, and primarily transfers the visible image onto the intermediate transferor and then secondarily transfers the visible image onto the recording medium. More preferably, visible images are each formed with two or more color toners with different colors, preferably in full colors, and the transfer device includes a primary transfer device that transfers the visible images onto the intermediate transferor to form a composite transferred image, and a secondary transfer device that transfers the composite transferred image onto the recording medium.

In the transfer process, the visible image may be transferred by charging the electrostatic latent image bearer (photoconductor) by a transfer charger. The transfer process can be performed by the transfer device. Preferably, the transfer device includes a primary transfer device to transfer the visible image onto an intermediate transferor to form a composite transfer image, and a secondary transfer device to transfer the composite transfer image onto a recording medium.

The intermediate transferor is not particularly limited and can be suitably selected from among known transferors to suit to a particular application. Preferred examples thereof include, but are not limited to, a transfer belt.

The transfer device (including the primary transfer device and the secondary transfer device) preferably includes a transferer configured to separate the visible image formed on the electrostatic latent image bearer (photoconductor) to the recording medium side by charging. The number of the transfer devices is at least one, and may be two or more.

Specific examples of the transfer device include, but are not limited to, a corona transferer utilizing corona discharge, a transfer belt, a transfer roller, a pressure transfer roller, and an adhesive transferer.

The recording medium is typically plain paper, but is not particularly limited and can be suitably selected to suit to a particular application as long as it is capable of transferring an unfixed image after development. Examples thereof include, but are not limited to, polyethylene terephthalate (PET) substrates used for overhead projectors (OHP).

Fixing Process and Fixing Device

The fixing device fixes a transferred image on the recording medium with a fixing member. The fixing device may conduct fixing every time each color toner is transferred onto the recording medium. Alternatively, the fixing device may conduct fixing at once after all color toners are superimposed on one another on the recording medium.

The fixing member is not particularly limited and can be suitably selected to suit to a particular application, but is preferably a known heat-pressure member. Specific examples of the heat-pressure member include, but are not limited to: a combination of a heat roller and a pressure roller; and a combination of a heat roller, a pressure roller, and an endless belt.

The heating temperature of the heat-pressure member is preferably from 80° C. to 200° C.

Other Processes and Other Devices

The other processes are not particularly limited and can be suitably selected to suit to a particular application. Examples thereof include, but are not limited to, a neutralization process, a cleaning process, a recycle process, and a control process.

The other devices are not particularly limited and can be suitably selected to suit to a particular application. Examples thereof include, but are not limited to, a neutralizer, a cleaner, a display, a recycler, and a controller.

Neutralization Process and Neutralizer

The neutralizer is not particularly limited and can be suitably selected to suit to a particular application as long as it is capable of applying a neutralization bias voltage to the electrostatic latent image bearer. Specific examples of the neutralizer include, but are not limited to, a neutralization lamp.

Cleaning Process and Cleaner

The cleaner is not particularly limited and can be suitably selected to suit to a particular application as long as it is capable of removing residual toner particles remaining on the electrostatic latent image bearer. Specific examples thereof include, but are not limited to, magnetic brush cleaner, electrostatic brush cleaner, magnetic roller cleaner, blade cleaner, brush cleaner, and web cleaner.

Recycle Process and Recycler

The recycler is not particularly limited and can be suitably selected to suit to a particular application. Specific examples thereof include, but are not limited to, a conveyer.

Control Process and Controller

The controller is not particularly limited and can be suitably selected to suit to a particular application as long as it is capable of controlling the above-described devices. Specific examples thereof include, but are not limited to, a sequencer and a computer.

Figure 2:
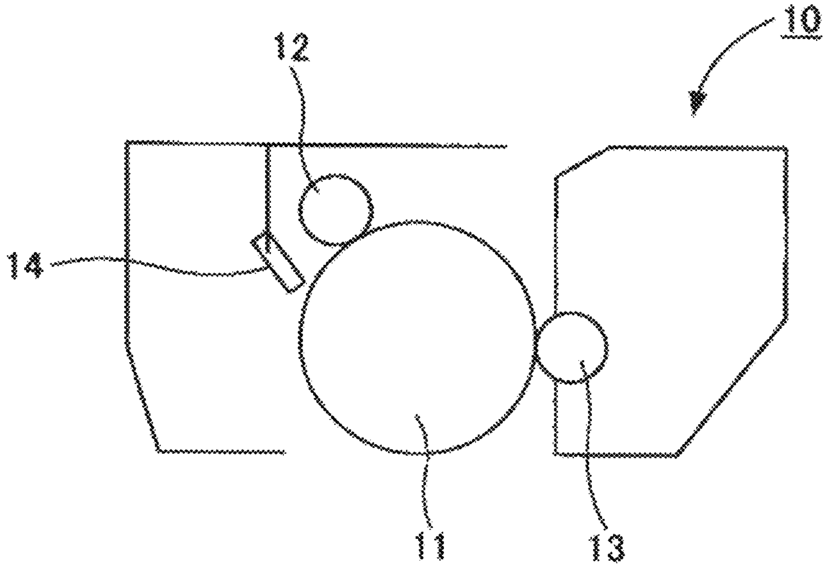
FIG. 2 is a schematic diagram illustrating a process cartridge according to an embodiment of the present invention.

FIG. 2 is a schematic diagram illustrating a process cartridge according to an embodiment of the present invention. A process cartridge 10 illustrated in FIG. 2 includes an electrostatic latent image bearer 11, a charger 12 to charge the electrostatic latent image bearer 11, a developing device 13 to develop an electrostatic latent image formed on the electrostatic latent image bearer 11 with the developer according to an embodiment of the present invention to form a toner image, and a cleaner 14 to remove residual toner remaining on the electrostatic latent image bearer 11 after the toner image has been transferred onto a recording medium. The process cartridge 10 is detachably mountable on an image forming apparatus such as a copier and a printer.

Next, a method of forming an image using the image forming apparatus on which the process cartridge 10 is mounted is described below.

First, the electrostatic latent image bearer 11 is driven to rotate at a certain peripheral speed. The circumferential surface of the electrostatic latent image bearer 11 is uniformly charged to a certain positive or negative potential by the charger 12. The charged circumferential surface of the electrostatic latent image bearer 11 is irradiated with exposure light emitted from an irradiator (e.g., slit exposure device, laser beam scanning exposure device), and an electrostatic latent image is formed thereon. The electrostatic latent image formed on the circumferential surface of the electrostatic latent image bearer 11 is developed with the developer according to an embodiment of the present invention by the developing device 13 to form a toner image.

The toner image formed on the circumferential surface of the electrostatic latent image bearer 11 is transferred onto a transfer sheet which is fed from a sheet feeder to between the electrostatic latent image bearer 11 and a transfer device in synchronization with rotation of the electrostatic latent image bearer 11. The transfer sheet having the transferred toner image thereon is separated from the circumferential surface of the electrostatic latent image bearer 11 and introduced into a fixing device. The toner image is fixed on the transfer sheet in the fixing device and then output as a copy from the image forming apparatus. On the other hand, after the toner image has been transferred, the surface of the electrostatic latent image bearer 11 is cleaned by removing residual toner by the cleaner 14 and then neutralized by a neutralizer, so that the electrostatic latent image bearer 11 gets ready for a next image forming operation.

EXAMPLES

Further understanding can be obtained by reference to certain specific examples which are provided herein for the purpose of illustration only and are not intended to be limiting.

Core Particle Production Example 1

Raw materials including 21.5 kg of $Fe_2O_3$ (average particle diameter: 0.3 μm, $SiO_2$ content: 0.02% by mass), 10.4 kg of $Mn_3O_4$ (average particle diameter: 0.5 μm. $SiO_2$ content: 0.01% by mass), and 0.28 kg of $SrCO_3$ (average particle diameter: 0.6 μm) were dispersed in 10.0 kg of pure water, and 120 g of carbon black as a reducing agent and 180 g of an ammonium polycarboxylate dispersant (CELUNA D305, product of Chukyo Yushi Co., Ltd.) as a dispersing agent were added thereto to obtain a mixture.

This mixture was pulverized by a wet ball mill (media diameter: 2 mm) to obtain a mixed slurry.

This mixed slurry was sprayed into hot air at about 130° C. by a spray dryer to obtain a dried granulated product having a particle diameter of 10 from 75 μm.

Fine particles having a particle diameter of 25 μm or less were removed from the granulated product using a sieve.

The granulated product was placed in an electric furnace and heated to 1,200° C. over 4.5 hours.

After that, the granulated product was maintained at 1,200° C. for 8 hours for firing.

After that, the granulated product was cooled to room temperature over 10 hours.

The concentration of oxygen in the electric furnace was set to 5,000 ppm during the firing and to 1,200 ppm during the cooling. The fired product was disintegrated using a hammer mill (HAMMER CRUSHER NH-34S, product of Sansho Industry Co., Ltd., screen opening: 0.3 mm) and classified using a vibration sieve. The fired product was then held at 450° C. for 1.5 hours in the air atmosphere for an oxidizing treatment (i.e., resistance increasing treatment). Thus, core particles C1 having an internal void ratio of 0% and an Rz of 2.5 μm were prepared.

Internal Void Ratio

The internal void ratio of the core particles was measured as follows. First, the core particles were cut, and a cross-section was photographed. The cross-section can be photographed by a conventionally known method such as scanning electron microscopy (SEM). Next, an area S of one particle is acquired from the photograph of the cross-section using a conventionally known image analysis software program (e.g., IMAGE PRO PREMIER, product of Media Cybernetics. Inc.). Similarly, an area s of void portions inside the one particle is acquired, and the void ratio of the one particle is calculated from the following formula.

$$\text{Void ratio of one particle } [\%] = (s/S) \times 100$$

This procedure was carried out for 50 randomly selected particles, and the average value was taken as the internal void ratio.

Rz

Rz was measured as follows. First, the surface of the carrier was observed using a confocal microscope OPTELICS C130 (product of Lasertec Corporation) with an ocular lens with a magnification of 50 times at a resolution of 0.44

μm and an imaging mode of “Max Peak” to obtain a three-dimensional image. A 12-μm square region in the obtained image of the carrier was analyzed to determine Rz. The analysis was performed at 50 regions, and the average of the 50 values was taken as Rz.

Core Particle Production Example 2

The procedure in Core Particle Production Example 1 was repeated except that the raw materials were replaced with 21.5 kg of $Fe_2O_3$ (average particle diameter: 0.9 μm, $SiO_2$ content: 0.02% by mass) and 10.4 kg of $Mn_3O_4$ (average particle diameter: 1.2 μm, $SiO_2$ content: 0.01% by mass) and that the firing temperature was changed to 1,000° C. Thus, core particles C2 having an internal void ratio of 2% and an Rz of 2.5 μm was prepared.

Core Particle Production Example 3

The procedure in Core Particle Production Example 1 was repeated except that the raw materials were replaced with 21.5 kg of $Fe_2O_3$ (average particle diameter: 0.6 μm, $SiO_2$ content: 0.02% by mass) and 10.4 kg of $Mn_3O_4$ (average particle diameter: 0.9 μm, $SiO_2$ content: 0.01% by mass). Thus, core particles C3 having an internal void ratio of 0% and an Rz of 2.5 μm was prepared.

Core Particle Production Example 4

The procedure in Core Particle Production Example 3 was repeated except that the firing temperature was changed to 1,080° C. Thus, core particles C4 having an internal void ratio of 0% and an Rz of 1.8 μm was prepared.

Core Particle Production Example 5

The procedure in Core Particle Production Example 3 was repeated except that the firing temperature was changed to 1,100° C. Thus, core particles C5 having an internal void ratio of 0% and an Rz of 2.0 μm was prepared.

Core Particle Production Example 6

The procedure in Core Particle Production Example 3 was repeated except that the firing temperature was changed to 1,300° C. Thus, core particles C6 having an internal void ratio of 0% and an Rz of 3.0 μm was prepared.

Core Particle Production Example 7

The procedure in Core Particle Production Example 3 was repeated except that the firing temperature was changed to 1,320° C. Thus, core particles C7 having an internal void ratio of 0% and an Rz of 3.2 μm was prepared.

Core Particle Production Example 8

The procedure in Core Particle Production Example 2 was repeated except that the firing temperature was changed to 950° C. Thus, core particles C8 having an internal void ratio of 2.2% and an Rz of 2.5 μm was prepared.

Core Particle Production Example 9

The procedure in Core Particle Production Example 1 was repeated except that the firing temperature was changed to 1,220° C. Thus, core particles C9 having an internal void ratio of 0% and an Rz of 2.5 μm was prepared.

Conductive Particles Production Example

First, 100 g of alumina (AKP-50, product of Sumitomo Chemical Co., Ltd.) were dispersed in 1 liter of water to obtain a suspension, and the suspension was heated to 65° C. To the suspension, a solution in which 600 g of stannic chloride and 18.0 g of sodium tungstate were dissolved in 1.7 liters of 2N hydrochloric acid and a 12% by weight ammonia water were added dropwise over 2 hours so that the pH of the suspension became 7 to 8. After the dropwise addition, the suspension was filtered and washed, and the resulting cake was dried at 110° C. Next, the dried powder was treated in a stream of nitrogen gas at 500° C. for 1 hour to obtain conductive particles.

Carrier Production Example 1

Preparation of Carrier

The following composition was dispersed by a homomixer for 10 minutes to prepare a coating layer forming liquid. The coating layer forming liquid was applied to the surfaces of the core particles C1 in an amount of 5,000 parts by mass using a SPIRA COTA (product of Okada Seiko Co., Ltd.) at an inner temperature of 55° C., followed by drying. The resulted particles were left to stand in an electric furnace at 200° C. for 1 hour for firing.

After being cooled, the ferrite powder bulk was pulverized with a sieve having an opening of 63 μm. Thus, a carrier 1 was prepared.

[Composition]

- Silicone resin solution (solid content: 20% by mass, SR2410, product of Dow Corning Toray Silicone Co., Ltd.): 510 parts by mass
- Titanium catalyst (solid content: 60% by mass. TC-750, product of Matsumoto Fine Chemical Co., Ltd.): 4 parts by mass
- Aminosilane (solid content: 100% by mass, SH6020, product of Dow Corning Toray Silicone Co., Ltd.): 3.2 parts by mass
- Chargeable particles P1 (titanium oxide, particle diameter: 450 nm): 18 parts by mass
- Conductive particles: 18 parts by mass
- Toluene: 1,000 parts by mass The R1, R2, R1/R2, average thicknesses, apparent density, and volume resistivity of the carrier 1 were 450, 450, 1.0, 0.85, 2.5, and 13.3, respectively, as measured as follows.

Measurement of R1, R2, R1/R2, and Average Thicknesses

The carrier was mixed in an embedding resin (DEVCON, product of ITW PP&F JAPAN Co., LTD, two-component mixture, 30-minute curable epoxy resin), left over one night or longer for curing, and mechanically polished to prepare a rough cross-section sample. The cross-section was finished using a cross-section polisher (SM-09010, product of JEOL Ltd.) under an acceleration voltage of 5.0 kV and a beam current of 120 μA. The finished cross-section was photographed using a scanning electron microscope (MERLIN, product of Carl Zeiss AG) under an accelerating voltage of 0.8 kV and a magnification of 30,000 times. The photographed image was incorporated into a TIFF (tagged image file format) image, and the major axis R1 [nm] and thickness R2 [nm] of 50 randomly-selected particles were measured using IMAGE-PRO PLUS, product of Media Cybernetics, Inc. The values of R1, R2, and R1/R2 for each of the 50 particles were respectively averaged. The average thickness

[μm] was measured from cross-sectional views of 50 randomly selected carrier particles. For each carrier particle, the thickness of the coating layer in the normal direction was measured at four points on the surface of the core particle. The average of the thickness values measured at 200 points in total was employed as the average thickness.

Apparent Density [g/cm$^3$]

The apparent density was measured according to the method described in JIS Z2504.

Volume Resistivity

The cell illustrated in FIG. 1, composed of a fluororesin container 2 accommodating electrodes 1$a$ and $l$ b each having a surface area of 2.5 cm×4 cm with a distance of 0.2 cm therebetween, was filled with a carrier 3 and thereafter subjected to tapping 10 times at falling height of 1 cm and a tapping speed of 30 times per minute. Next, a direct-current voltage of 1,000 V was applied to between the electrodes 1$a$ and 1$b$, and 30 seconds later, a resistance value r [Ω] was measured using a HIGH RESISTANCE METER 4329A (product of Yokogawa-Hewlett-Packard, Ltd.). The volume resistivity [Ω·cm] was calculated from the following formula.

$$r \times (2.5 \times 4)/0.2$$

Carrier Production Example 2

The procedure in Carrier Production Example 1 was repeated except that the chargeable particles were replaced with other chargeable particles P2 (titanium oxide, particle diameter: 450 nm), thus preparing a carrier 2. The R1, R2, R1/R2, average thickness, apparent density, and volume resistivity of the carrier 2 were 450, 150, 3.0, 0.85, 2.5, and 13.4, respectively.

Carrier Production Example 3

The procedure in Carrier Production Example 1 was repeated except that the core particles were replaced with the core particles C2, thus preparing a carrier 3. The R1, R2, R1/R2, average thickness, apparent density, and volume resistivity of the carrier 3 were 450, 450, 1.0, 0.85, 2.0, and 13.1, respectively.

Carrier Production Example 4

The procedure in Carrier Production Example 1 was repeated except that the core particles were replaced with the core particles C2 and that the chargeable particles were replaced with other chargeable particles P2 (titanium oxide, particle diameter: 450 nm), thus preparing a carrier 4. The R1, R2, R1/R2, average thickness, apparent density, and volume resistivity of the carrier 4 were 450, 150, 3.0, 0.85, 2.0, and 13.2, respectively.

Carrier Production Example 5

The procedure in Carrier Production Example 1 was repeated except that the core particles were replaced with the core particles C3 and that the chargeable particles were replaced with other chargeable particles P3 (titanium oxide, particle diameter: 280 nm), thus preparing a carrier 5. The R1, R2, R1/R2, average thickness, apparent density, and volume resistivity of the carrier 5 were 280, 190, 1.5, 0.85, 2.3, and 13.3, respectively.

Carrier Production Example 6

The procedure in Carrier Production Example 1 was repeated except that the core particles were replaced with the core particles C3 and that the chargeable particles were replaced with other chargeable particles P4 (titanium oxide, particle diameter: 300 nm), thus preparing a carrier 6. The R1, R2, R1/R2, average thickness, apparent density, and volume resistivity of the carrier 6 were 300, 200, 1.5, 0.85, 2.3, and 13.1, respectively.

Carrier Production Example 7

The procedure in Carrier Production Example 1 was repeated except that the core particles were replaced with the core particles C3 and that the chargeable particles were replaced with other chargeable particles P5 (titanium oxide, particle diameter: 600 nm), thus preparing a carrier 7. The R1, R2, R1/R2, average thickness, apparent density, and volume resistivity of the carrier 7 were 600, 400, 1.5, 0.85, 2.3, and 13.2, respectively.

Carrier Production Example 8

The procedure in Carrier Production Example 1 was repeated except that the core particles were replaced with the core particles C3 and that the chargeable particles were replaced with other chargeable particles P6 (titanium oxide, particle diameter: 620 nm), thus preparing a carrier 8. The R1, R2, R1/R2, average thickness, apparent density, and volume resistivity of the carrier 8 were 620, 420, 1.5, 0.85, 2.3, and 13.1, respectively.

Carrier Production Example 9

The procedure in Carrier Production Example 1 was repeated except that the core particles were replaced with the core particles C4 and that the chargeable particles were replaced with other chargeable particles P7 (titanium oxide, particle diameter: 450 nm), thus preparing a carrier 9. The R1, R2, R1/R2, average thickness, apparent density, and volume resistivity of the carrier 9 were 450, 300, 1.5, 0.85, 2.4, and 13.2, respectively.

Carrier Production Example 10

The procedure in Carrier Production Example 1 was repeated except that the core particles were replaced with the core particles C5 and that the chargeable particles were replaced with the chargeable particles P7, thus preparing a carrier 10. The R1, R2, R1/R2, average thickness, apparent density, and volume resistivity of the carrier 10 were 450, 300, 1.5, 0.85, 2.4, and 13.1, respectively.

Carrier Production Example 11

The procedure in Carrier Production Example 1 was repeated except that the core particles were replaced with the core particles C6 and that the chargeable particles were replaced with the chargeable particles P7, thus preparing a carrier 11. The R1, R2. R1/R2, average thickness, apparent density, and volume resistivity of the carrier 11 were 450, 300, 1.5, 0.85, 2.2, and 13.4, respectively.

Carrier Production Example 12

The procedure in Carrier Production Example 1 was repeated except that the core particles were replaced with the core particles C7 and that the chargeable particles were replaced with the chargeable particles P7, thus preparing a carrier 12. The R1, R2, R1/R2, average thickness, apparent density, and volume resistivity of the carrier 12 were 450, 300, 1.5, 0.85, 2.2, and 13.3, respectively.

Carrier Production Example 13

The procedure in Carrier Production Example 1 was repeated except that the core particles were replaced with the core particles C3, the amount of the silicone resin solution was changed to 270 parts, and the chargeable particles were replaced with the chargeable particles P7, thus preparing a carrier 13. The R1, R2, R1/R2, average thickness, apparent density, and volume resistivity of the carrier 13 were 450, 300, 1.5, 0.45, 2.3, and 13.2, respectively.

Carrier Production Example 14

The procedure in Carrier Production Example 1 was repeated except that the core particles were replaced with the core particles C3, the amount of the silicone resin solution was changed to 300 parts, and the chargeable particles were replaced with the chargeable particles P7, thus preparing a carrier 14. The R1, R2, R1/R2, average thickness, apparent density, and volume resistivity of the carrier 14 were 450, 300, 1.5, 0.50, 2.3, and 13.2, respectively.

Carrier Production Example 15

The procedure in Carrier Production Example 1 was repeated except that the core particles were replaced with the core particles C3 and that the chargeable particles were replaced with the chargeable particles P7, thus preparing a carrier 15. The R1, R2, R1/R2, average thickness, apparent density, and volume resistivity of the carrier 15 were 450, 300, 1.5, 0.85, 2.3, and 13.1, respectively.

Carrier Production Example 16

The procedure in Carrier Production Example 1 was repeated except that the core particles were replaced with the core particles C3, the amount of the silicone resin solution was changed to 660 parts, and the chargeable particles were replaced with the chargeable particles P7, thus preparing a carrier 16. The R1, R2, R1/R2, average thickness, apparent density, and volume resistivity of the carrier 16 were 450, 300, 1.5, 1.10, 2.3, and 13.1, respectively.

Carrier Production Example 17

The procedure in Carrier Production Example 1 was repeated except that the core particles were replaced with the core particles C3, the amount of the silicone resin solution was changed to 690 parts, and the chargeable particles were replaced with the chargeable particles P7, thus preparing a carrier 17. The R1, R2, R1/R2, average thickness, apparent density, and volume resistivity of the carrier 17 were 450, 300, 1.5, 1.15, 2.3, and 13.3, respectively.

Carrier Production Example 18

The procedure in Carrier Production Example 1 was repeated except that the core particles were replaced with the core particles C3 and that the chargeable particles were replaced with other chargeable particles P8 (barium sulfate, particle diameter: 450 nm), thus preparing a carrier 18. The R1, R2, R1/R2, average thickness, apparent density, and volume resistivity of the carrier 18 were 450, 300, 1.5, 0.85, 2.3, and 13.1, respectively.

Carrier Production Comparative Example 1

The procedure in Carrier Production Example 1 was repeated except that the core particles were replaced with the core particles C8 and that the chargeable particles were replaced with the chargeable particles P7, thus preparing a carrier 1'. The R1, R2, R1/R2, average thickness, apparent density, and volume resistivity of the carrier 1' were 450, 300, 1.5, 0.85, 1.9, and 13.3, respectively.

Carrier Production Comparative Example 2

The procedure in Carrier Production Example 1 was repeated except that the core particles were replaced with the core particles C9 and that the chargeable particles were replaced with the chargeable particles P7, thus preparing a carrier 2'. The R1, R2, R1/R2, average thickness, apparent density, and volume resistivity of the carrier 2' were 450, 300, 1.5, 0.85, 2.6, and 13.3, respectively.

Carrier Production Comparative Example 3

The procedure in Carrier Production Example 1 was repeated except that the core particles were replaced with the core particles C3 and that the chargeable particles were replaced with other chargeable particles P9 (titanium oxide, particle diameter: 450 nm), thus preparing a carrier 3'. The R1, R2, R1/R2, average thickness, apparent density, and volume resistivity of the carrier 3' were 450, 500, 0.9, 0.85, 2.3, and 13.1, respectively.

Carrier Production Comparative Example 4

The procedure in Carrier Production Example 1 was repeated except that the core particles were replaced with the core particles C3 and that the chargeable particles were replaced with other chargeable particles P10 (titanium oxide, particle diameter; 450 nm), thus preparing a carrier 4'. The R1, R2, R1/R2, average thickness, apparent density, and volume resistivity of the carrier 4' were 450, 140, 3.2, 0.85, 2.3, and 13.2, respectively.

Properties of the carriers 1 to 18 and carriers 1' to 4' are presented in Tables 1-1 and 1-2.

TABLE 1-1

| | Developer | Carrier | Core Particle | Internal Void Ratio [%] | Rz [μm] | Chargeable Particle |
|---|---|---|---|---|---|---|
| Ex. 1 | 1 | 1 | C1 | 0 | 2.5 | P1 |
| Ex. 2 | 2 | 2 | C1 | 0 | 2.5 | P2 |
| Ex. 3 | 3 | 3 | C2 | 2 | 2.5 | P1 |
| Ex. 4 | 4 | 4 | C2 | 2 | 2.5 | P2 |
| Ex. 5 | 5 | 5 | C3 | 0 | 2.5 | P3 |
| Ex. 6 | 6 | 6 | C3 | 0 | 2.5 | P4 |
| Ex. 7 | 7 | 7 | C3 | 0 | 2.5 | P5 |
| Ex. 8 | 8 | 8 | C3 | 0 | 2.5 | P6 |
| Ex. 9 | 9 | 9 | C4 | 0 | 1.8 | P7 |
| Ex. 10 | 10 | 10 | C5 | 0 | 2.0 | P7 |
| Ex. 11 | 11 | 11 | C6 | 0 | 3.0 | P7 |
| Ex. 12 | 12 | 12 | C7 | 0 | 3.2 | P7 |
| Ex. 13 | 13 | 13 | C3 | 0 | 2.5 | P7 |
| Ex. 14 | 14 | 14 | C3 | 0 | 2.5 | P7 |
| Ex. 15 | 15 | 15 | C3 | 0 | 2.5 | P7 |
| Ex. 16 | 16 | 16 | C3 | 0 | 2.5 | P7 |
| Ex. 17 | 17 | 17 | C3 | 0 | 2.5 | P7 |
| Ex. 18 | 18 | 18 | C3 | 0 | 2.5 | P8 |
| Comp. Ex. 1 | 1' | 1' | C8 | 2.2 | 2.5 | P7 |
| Comp. Ex. 2 | 2' | 2' | C9 | 0 | 2.5 | P7 |

TABLE 1-1-continued

| | Developer | Carrier | Core Particle | Internal Void Ratio [%] | Rz [μm] | Chargeable Particle |
|---|---|---|---|---|---|---|
| Comp. Ex. 3 | 3' | 3' | C3 | 0 | 2.5 | P9 |
| Comp. Ex. 4 | 4' | 4' | C3 | 0 | 2.5 | P10 |

TABLE 1-2

| | R1 [μm] | R2 [μm] | R1/R2 | Average Thickness [μm] | Apparent Density [g/cm$^3$] | Volume Resistivity [Ω · cm] |
|---|---|---|---|---|---|---|
| Ex. 1 | 450 | 450 | 1.0 | 0.85 | 2.5 | 13.3 |
| Ex. 2 | 450 | 150 | 3.0 | 0.85 | 2.5 | 13.4 |
| Ex. 3 | 450 | 450 | 1.0 | 0.85 | 2.0 | 13.1 |
| Ex. 4 | 450 | 150 | 3.0 | 0.85 | 2.0 | 13.2 |
| Ex. 5 | 280 | 190 | 1.5 | 0.85 | 2.0 | 13.3 |
| Ex. 6 | 300 | 200 | 1.5 | 0.85 | 2.3 | 13.1 |
| Ex. 7 | 600 | 400 | 1.5 | 0.85 | 2.3 | 13.2 |
| Ex. 8 | 620 | 420 | 1.5 | 0.85 | 2.3 | 13.1 |
| Ex. 9 | 450 | 300 | 1.5 | 0.85 | 2.4 | 13.2 |
| Ex. 10 | 450 | 300 | 1.5 | 0.85 | 2.4 | 13.1 |
| Ex. 11 | 450 | 300 | 1.5 | 0.85 | 2.2 | 13.4 |
| Ex. 12 | 450 | 300 | 1.5 | 0.85 | 2.2 | 13.3 |
| Ex. 13 | 450 | 300 | 1.5 | 0.45 | 2.3 | 13.2 |
| Ex. 14 | 450 | 300 | 1.5 | 0.50 | 2.3 | 13.2 |
| Ex. 15 | 450 | 300 | 1.5 | 0.85 | 2.3 | 13.1 |
| Ex. 16 | 450 | 300 | 1.5 | 1.10 | 2.3 | 13.1 |
| Ex. 17 | 450 | 300 | 1.5 | 1.15 | 2.3 | 13.3 |
| Ex. 18 | 450 | 300 | 1.5 | 0.85 | 2.3 | 13.1 |
| Comp. Ex. 1 | 450 | 300 | 1.5 | 0.85 | 1.9 | 13.3 |
| Comp. Ex. 2 | 450 | 300 | 1.5 | 0.85 | 2.6 | 13.3 |
| Comp. Ex. 3 | 450 | 500 | 0.9 | 0.85 | 2.3 | 13.1 |
| Comp. Ex. 4 | 450 | 140 | 3.2 | 0.85 | 2.3 | 13.2 |

Toner Production Example 1

Preparation of Toner 1

Synthesis of Polyester Resin A

In a reaction vessel equipped with a thermometer, a stirrer, a condenser tube, and a nitrogen introducing tube, 443 parts by mass of PO adduct of bisphenol A (hydroxyl value: 320 mgKOH/g), 135 parts by mass of diethylene glycol, 422 parts by mass of terephthalic acid, and 2.5 parts by mass of dibutyltin oxide were allowed to react at 200° C. until the acid value reached 10 mgKOH/g. Thus, a polyester resin A was prepared. The glass transition temperature (Tg) and peak number average molecular weight of the polyester resin A were 63° C. and 6,000, respectively.

Synthesis of Polyester Resin B

In a reaction vessel equipped with a thermometer, a stirrer, a condenser tube, and a nitrogen introducing tube, 443 parts by mass of PO adduct of bisphenol A (hydroxyl value: 320 mgKOH/g), 135 parts by mass of diethylene glycol, 422 parts by mass of terephthalic acid, and 2.5 parts by mass of dibutyltin oxide were allowed to react at 230° C. until the acid value reached 7 mgKOH/g. Thus, a polyester resin B was prepared. The glass transition temperature (Tg) and peak number average molecular weight of the polyester resin B were 65° C. and 16,000, respectively.

Production of Mother Toner Particles

The above toner materials were mixed by a HENSCHEL MIXER 20B (product of NIPPON COKE & ENGINEERING CO., LTD.) at 1,500 rpm for 3 minutes and then kneaded with a single-axis kneader (compact BUSS CO-KNEADER, product of Buss AG) at an inlet temperature of 100° C., an outlet temperature of 50° C., and a feed amount of 2 kg/hr.

Composition of Mother Toner Particles

Polyester resin A: 40 parts by mass

Polyester resin B: 60 parts by mass

Camauba wax (WA-05, product of CERARICA NODA Co., Ltd.): 1 part by mass

Carbon black (#44, product of Mitsubishi Chemical Corporation): 15 parts by mass The kneaded product was rolled and cooled, then pulverized by a pulverizer, and further finely pulverized by an I-type mill (IDS-2, product of Nippon Pneumatic Mfg. Co., Ltd.) using a flat impact plate under an air pressure of 6.8 atm/cm$^2$ and a feed amount of 0.5 kg/hr, followed by classification using a classifier (132MP, product of Alpine). Thus, mother toner particles were obtained.

External Treatment Process

Next, to 100 parts by mass of the mother toner particles, 0.5 parts by mass of a large-particle-diameter silica (MSP-009, product of TAYCA Corporation, secondary particle diameter: 160 nm) and 1.0 part by mass of a small-particle-diameter silica (MSP-015, product of TAYCA Corporation, secondary particle diameter: 40 nm) were added as external additives, followed by mixing using a HENSCHEL MIXER to obtain toner particles. Thus, a toner 1 was prepared. The volume average particle diameter of the toner 1 was 7.2 μm.

Developer Production Examples 1 to 18 and Comparative Developer Production Examples 1 to 4

Preparation of Developers 1 to 18 and Developers 1' to 4'

Each of the carriers 1 to 18 and 1' to 4' in an amount of 93 parts by mass was mixed with the toner 1 in an amount of 7.0 parts by mass, and the mixture was stirred for 20 minutes using a ball mill to prepare two-component developers 1 to 18 and 1' to 4'.

Developer Properties

Each of the above-prepared two-component developers was put in a digital color copier-printer multifunction peripheral (RICOH PRO C901, product of Ricoh Co., Ltd.), and an image evaluation was performed at a temperature of 23° C. and a relative humidity of 55%. Specifically, a running test in which an image with an area ratio of 2% was printed on 1,000,000 sheets was performed using the developers 1 to 14 of Examples and the developers 1' to 4' of Comparative Examples and the toner 1, and various evaluations were performed.

The results are presented in Table 2.

Evaluation of Image Density

The center of a solid portion of 30 mm×30 mm was measured with a spectrocolorimeter (X-RITE 938, product of X-Rite Inc.). This measurement was performed at five points, and the average of the measured values was calculated. The difference in image density (ID) between the initial image and the image output after the output on 1,000,000 sheets was evaluated according to the following criteria.

Here, the solid portion is a portion where the developing potential is 400 V=(exposed portion potential−developing bias DC)=−100 V−(−500V).

Evaluation Criteria

A+: The difference in ID is 0 or more and less than 0.2. Very good.

A: The difference in ID is 0.2 or more and less than 0.3. Good.

B: The difference in ID was 0.3 or more and less than 0.4. Acceptable.

C: The difference in ID is 0.4 or more. Poor.

Carrier Deposition (in Solid Portions)

Carrier deposition causes damage to photoconductors and fixing rollers and deterioration of image quality. Since only a part of the carrier is transferred to a paper sheet even when carrier deposition occurs on the photoconductor, the evaluation was performed as follows.

The number of carrier particles adhering to a solid image (30 mm-30 mm) on the photoconductor under a developing condition in which the charge potential (Vd) was −600V, the potential of a portion corresponding to an image portion (i.e., solid image) after exposure was −100 V, and the developing bias was DC-500 V was counted to evaluate the degree of carrier deposition (in solid portions).

Evaluation Criteria

A+: Very good (No carrier deposition.)

A: Good (Carrier deposition appears, but the image is not affected.)

B: Acceptable (Carrier deposition appears in the image, but the degree thereof is acceptable.)

C: Acceptable (Carrier deposition appears in the image, and the degree thereof is unacceptable.)

Carrier Deposition at Edge Portions

An image having 2 dot lines (100 lpi/inch) was formed on a photoconductor in the sub-scanning direction under a developing condition in which the charged potential (Vd) was −600 V, the exposed portion potential was −100 V, the developing bias (Vb) was DC-400 V, that is, the background potential was 200 V The 2 dot lines developed on the photoconductor were transferred onto a piece of adhesive tape (having an area of 100 $cm^2$), and the number of transferred carrier particles was counted to evaluate the degree of carrier deposition.

Evaluation Criteria

A+: Very good (No carrier deposition.)

A: Good (Carrier deposition appears, but the image is not affected.)

B: Acceptable (Carrier deposition appears in the image, but the degree thereof is acceptable.)

C: Acceptable (Carrier deposition appears in the image, and the degree thereof is unacceptable.)

Ghost Image

Figure 4:
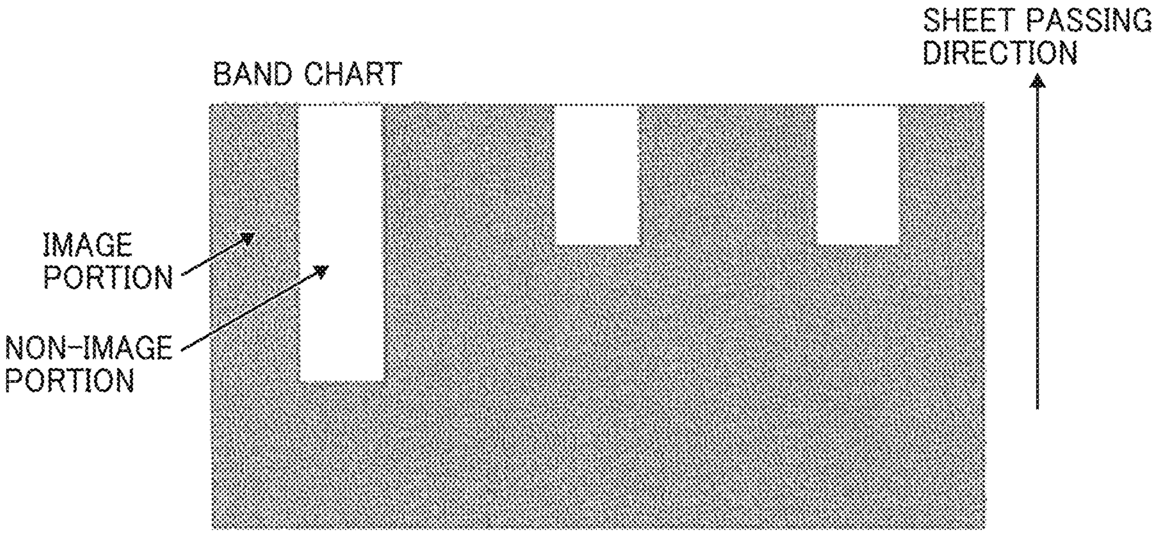
FIG. 4 is a diagram for explaining a band chart used in Examples.

A ghost image was formed by first outputting a character chart having an image area ratio of 8% (in which the size of one character was about 2 mm×2 mm) on 100,000 sheets and then printing a band chart illustrated in FIG. 4. The density difference between a portion (a) corresponding to one round of sleeve and another portion (b) corresponding to after one round was measured using an instrument X-Rite 938 (product of X-Rite Inc.) at three measurement positions. i.e., center, rear, and front positions. The average density difference among the three measurement positions was defined as ΔID, and ΔID was ranked as follows.

A+: Very good, A: Good, B: Usable. C: Practically unusable

Ranks A, B, and C are acceptable, and rank D is unacceptable.

A+: 0.01≥ΔID

A: 0.01<ΔID≤003

B 0.03<ΔID≤0.06

C: 0.06<ΔID

The results obtained after printing on 1,000,000 sheets are presented in Table 2.

TABLE 2

| | Developer | Image Density | Carrier Deposition at Solid Portions | Carrier Deposition at Edge Portions | Ghost Image |
|---|---|---|---|---|---|
| Ex. 1 | 1 | B | B | B | B |
| Ex. 2 | 2 | A | B | A | B |
| Ex. 3 | 3 | B | B | B | A+ |
| Ex. 4 | 4 | A | B | A | A+ |
| Ex. 5 | 5 | A | A | A | A |
| Ex. 6 | 6 | A | A | A | A |
| Ex. 7 | 7 | A | B | A | A |
| Ex. 8 | 8 | A | A | A | A |
| Ex. 9 | 9 | A | A | A | A |
| Ex. 10 | 10 | A | A | A | A |
| Ex. 11 | 11 | A | B | A | A |
| Ex. 12 | 12 | A | B | A | A |
| Ex. 13 | 13 | A | B | A | A |
| Ex. 14 | 14 | A | B | A | A |
| Ex. 15 | 15 | A | A | A | A |
| Ex. 16 | 16 | A | A | B | B |
| Ex. 17 | 17 | A | A | B | B |
| Ex. 18 | 18 | A+ | A+ | A+ | A+ |
| Comp. Ex. 1 | 1' | A | C | C | A+ |
| Comp. Ex. 2 | 2' | A | A | A | C |
| Comp. Ex. 3 | 3' | C | A | C | A |
| Comp. Ex. 4 | 4' | A | C | A | A |

It is clear from Table 2 that the developers of Examples delivered practically satisfactory or excellent results in the evaluations of image density, carrier deposition in solid portion, carrier deposition at edge portions, and ghost image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A carrier for developing an electrostatic latent image, the carrier comprising:

a core particle having an internal void ratio of from 0.0% to 2.0%; and a coating layer coating the core particle, the coating layer containing flat chargeable particles satisfying Formula 1 below:

$$1.0 \leq R1/R2 \leq 3.0 \qquad \text{Formula 1}$$

where R1 [nm] and R2 [nm] represent a major axis and a thickness, respectively, of each of the flat chargeable particles, wherein the carrier has an apparent density of from 2.0 to 2.5 $g/cm^3$.

2. The carrier according to claim 1, wherein the major axis R1 is from 300 to 600 nm.

3. The carrier according to claim 2, wherein the core particle has a surface roughness Rz of 2.0 μm or more and less than 3.0 μm.

4. The carrier according to claim 1, wherein the coating layer has an average thickness of from 0.50 to 1.10 μm.

5. The carrier according to claim 1, wherein the flat chargeable particles comprise barium sulfate.

6. A two-component developer comprising:

the carrier according to claim 1; and a toner.

7. An image forming apparatus comprising:

an electrostatic latent image bearer;

a charger to charge the electrostatic latent image bearer;

an irradiator to form an electrostatic latent image on the electrostatic latent image bearer;

a developing device containing the two-component developer according to claim 6, the developing device configured to develop the electrostatic latent image into a toner image with the two-component developer;

a transfer device configured to transfer the toner image from the electrostatic latent image bearer onto a recording medium; and a fixing device configured to fix the transferred toner image on the recording medium.

8. A process cartridge comprising:

an electrostatic latent image bearer;

a charger to charge the electrostatic latent image bearer;

a developing device containing the two-component developer according to claim 6, the developing device configured to develop an electrostatic latent image on the electrostatic latent image bearer into a toner image with the two-component developer; and a cleaner to clean the electrostatic latent image bearer.

9. An image forming method comprising:

forming an electrostatic latent image on an electrostatic latent image bearer;

developing the electrostatic latent image into a toner image with the two-component developer according to claim 6;

transferring the toner image from the electrostatic latent image bearer onto a recording medium, and fixing the transferred toner image on the recording medium.

* * * * *